US012739678B2

(12) United States Patent
Shi et al.

(10) Patent No.: US 12,739,678 B2
(45) Date of Patent: Sep. 15, 2026

(54) COMMUNICATION METHOD AND APPARATUS BASED ON MEASUREMENT RELAXATION MECHANISM, AND STORAGE MEDIUM

(71) Applicant: BEIJING XIAOMI MOBILE SOFTWARE CO., LTD., Beijing (CN)

(72) Inventors: Rao Shi, Beijing (CN); Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 239 days.

(21) Appl. No.: 18/292,839

(22) PCT Filed: Jul. 29, 2021

(86) PCT No.: PCT/CN2021/109301

§ 371 (c)(1),
(2) Date: Jan. 26, 2024

(87) PCT Pub. No.: WO2023/004692

PCT Pub. Date: Feb. 2, 2023

(65) Prior Publication Data

US 2024/0292252 A1 Aug. 29, 2024

(51) Int. Cl.
*H04W 24/10* (2009.01)
*H04B 17/318* (2015.01)
*H04W 76/20* (2018.01)

(52) U.S. Cl.
CPC .......... *H04W 24/10* (2013.01); *H04B 17/328* (2023.05); *H04W 76/20* (2018.02)

(58) Field of Classification Search
None
See application file for complete search history.

(56) References Cited

U.S. PATENT DOCUMENTS 12,015,984 B2 * 6/2024 Wong .................... H04W 24/10
12,022,440 B2 * 6/2024 Zhang ............... H04W 72/0446
2021/0105643 A1 * 4/2021 Kim ...................... H04W 48/16
2021/0105649 A1 4/2021 Lee
2022/0007225 A1 * 1/2022 Li ......................... H04W 48/16
2024/0224103 A1 * 7/2024 Koskinen .............. H04W 24/10
2025/0113262 A1 * 4/2025 Tao .................. H04W 36/0088

FOREIGN PATENT DOCUMENTS

WO WO 2020249199 A1 12/2020

OTHER PUBLICATIONS

PCT/CN2021/109301, International Search Report dated Mar. 29, 2022, 2 pages.
Mediatek Inc. "Report of email discussion [105bis# 29][NR/Power Saving] RRM Solutions" 3GPP TSG-RAN WG2 Meeting #106, R2-1906500 May 2019, 20 pages.

(Continued)

*Primary Examiner* — Phirin Sam
(74) *Attorney, Agent, or Firm* — Cozen O'Connor

(57) ABSTRACT

A communication method based on a measurement relaxation mechanism includes: obtaining measurement relaxation criterion information sent by a network device, the measurement relaxation criterion information indicating a measurement relaxation criterion for performing measurement relaxation when a terminal is in a connected state.

21 Claims, 7 Drawing Sheets

S11 obtaining measurement relaxation criterion information sent by a network device, in which the measurement relaxation criterion information indicating a measurement relaxation criterion for performing measurement relaxation when a terminal is in a connected state

(56) References Cited

OTHER PUBLICATIONS

Chinese Patent Application No. 2021800022174 Office dated May 31, 2023, 7 pages.
Chinese Patent Application No. 2021800022174 English translation of Office dated May 31, 2023, 12 pages.
European Patent Application No. 21951299.3 Search Report dated Jul. 29, 2024, 9 pages.
Vivo, "RRM measurement relaxation criteria"; 3GPP TSG-RAN WG2 Meeting #107bis, R2-1912334; Oct. 2019, 5 pages.

* cited by examiner

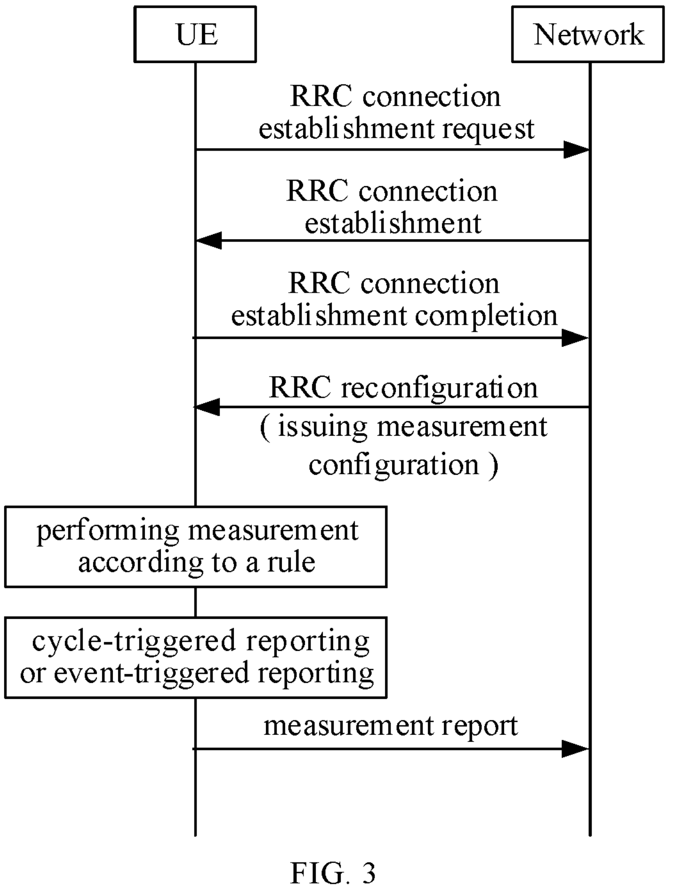

FIG. 3

S11 obtaining measurement relaxation criterion information sent by a network device, in which the measurement relaxation criterion information indicating a measurement relaxation criterion for performing measurement relaxation when a terminal is in a connected state

FIG. 4

S21 obtaining measurement configuration information configured by the network device, the measurement configuration information indicating the measurement relaxation criterion information

FIG. 5

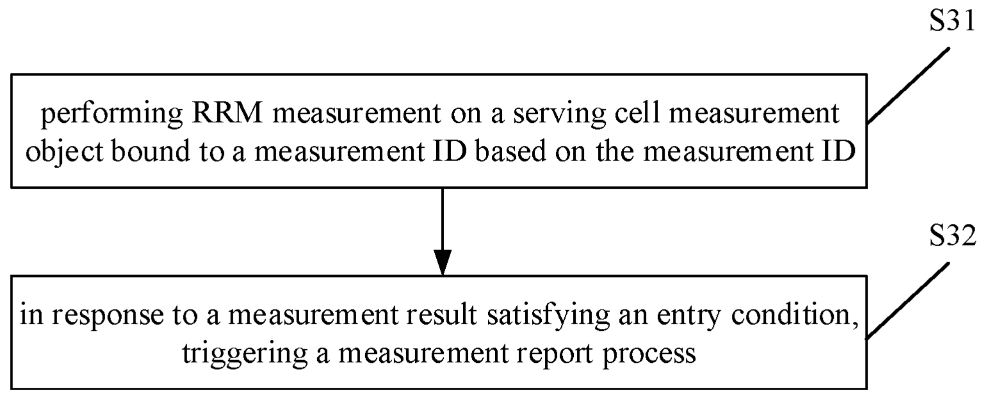

FIG. 6

S41 performing RRM measurement on a serving cell measurement object bound to a measurement ID based on the measurement ID

S42 in response to a measurement result satisfying an entry condition, triggering a measurement report process

S43 continuing to perform the RRM measurement on the serving cell measurement object based on the measurement ID, and in response to the measurement result satisfying an exit condition, stopping the RRM measurement relaxation, and/or triggering the measurement report process

FIG. 7

S51 obtaining a measurement relaxation criterion parameter for indicating the terminal to perform the measurement relaxation sent by a network device

FIG. 8

S71 sending measurement relaxation criterion information, the measurement relaxation criterion information indicating a measurement relaxation criterion for performing measurement relaxation when a terminal is in a connected state

COMMUNICATION METHOD AND APPARATUS BASED ON MEASUREMENT RELAXATION MECHANISM, AND STORAGE MEDIUM

CROSS REFERENCE TO RELATED APPLICATIONS

This application is a U.S. national phase of International Application No. PCT/CN2021/109301, filed on Jul. 29, 2021, the entire contents of which are incorporated herein by reference.

TECHNICAL FIELD

The disclosure relates to a field of communication technologies, more particularly, to a communication method based on a measurement relaxation mechanism, a communication apparatus based on a measurement relaxation mechanism and a storage medium.

BACKGROUND

In a mobile communication system, movement of a terminal causes channel conditions around it to change over time. In order to support the mobility of the terminal and obtain current cell channel conditions of the terminal in a timely manner, the network may configure radio resource management (RRM) measurement for the terminal, to measure signal qualities of a current serving cell and neighboring cells of the terminal. However, excessive RRM measurements may increase power consumption of the terminal and affect its endurance capacity. In a Rel-16 standard, new radio (NR) introduces an RRM measurement relaxation mechanism for the terminal in an idle state. That is, when the terminal is in low mobility and/or at a non-cell edge, it is determined that there is a small possibility for the terminal to perform cell reselection/handover, and the terminal is allowed to carry out RRM measurement relaxation to a certain extent, e.g., extending a measurement cycle or stopping the measurement of neighboring cells, to achieve the objective of lowering power consumption.

SUMMARY

According to a first aspect of embodiments of the disclosure, a communication method based on a measurement relaxation mechanism is provided. The method is performed by a terminal, and includes:

obtaining measurement relaxation criterion information sent by a network device, in which the measurement relaxation criterion information indicating a measurement relaxation criterion for performing measurement relaxation when a terminal is in a connected state; in which, in response to a measurement result satisfying the measurement relaxation criterion, performing at least one of: the measurement relaxation, or reporting a measurement relaxation indication based on a new information element (IE) parameter; in response to a measurement result not satisfying the measurement relaxation criterion, performing at least one of: stopping the measurement relaxation, or reporting a measurement relaxation indication based on a new IE parameter.

According to a second aspect of embodiments of the disclosure, a communication method based on a measurement relaxation mechanism is provided. The method is performed by a network device, and includes:

sending measurement relaxation criterion information, in which the measurement relaxation criterion information indicating a measurement relaxation criterion for performing measurement relaxation when a terminal is in a connected state; and obtaining, based on a new information element (IE) parameter, a measurement relaxation indication reported by the terminal, the measurement relaxation indication indicating the measurement relaxation criterion used by the terminal; in which, in response to a measurement result satisfying the measurement relaxation criterion, the terminal performs at least one of: the measurement relaxation, or reporting the measurement relaxation indication based on the new IE parameter; in response to a measurement result not satisfying the measurement relaxation criterion, the terminal performs at least one of: stopping the measurement relaxation, or reporting the measurement relaxation indication based on the new IE parameter.

According to a third aspect of embodiments of the disclosure, a communication device based on a measurement relaxation mechanism is provided. The device includes:

a processor; and a memory for storing instructions executable by the processor; in which the processor is configured to: perform the communication method based on a measurement relaxation mechanism of the first aspect or any implementation of the first aspect.

According to a fourth aspect of embodiments of the disclosure, a communication device based on a measurement relaxation mechanism is provided. The device includes:

a processor; and a memory for storing instructions executable by the processor; in which the processor is configured to: perform the communication method based on a measurement relaxation mechanism of the second aspect or any implementation of the second aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a schematic diagram of an overall process for a terminal to perform RRM measurement according to an exemplary embodiment.

FIG. 4 is a flowchart of a communication method based on a measurement relaxation mechanism according to an exemplary embodiment.

FIG. 5 is a flowchart of a communication method based on a measurement relaxation mechanism according to an exemplary embodiment.

FIG. 6 is a flowchart of a communication method based on a measurement relaxation mechanism according to an exemplary embodiment.

FIG. 7 is a flowchart of a communication method based on a measurement relaxation mechanism according to an exemplary embodiment.

FIG. 8 is a flowchart of a communication method based on a measurement relaxation mechanism according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects of the disclosure as recited in the appended claims.

Figure 1:
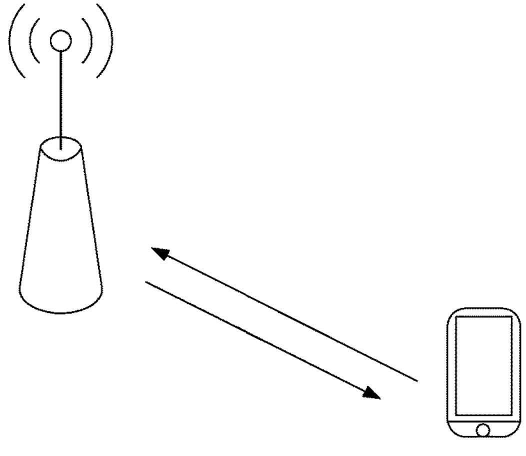
FIG. 1 is a schematic diagram of a wireless communication system according to an exemplary embodiment.

The communication method based on a measurement relaxation mechanism provided by the embodiments of the disclosure may be applied in a wireless communication system shown in FIG. 1. As illustrated in FIG. 1, the wireless communication system includes: a terminal and a network device. Information is transmitted and received between the terminal and the network device via wireless resources.

It is understood that the wireless communication system shown in FIG. 1 is only for schematic illustration, and the wireless communication system may also include other network devices, such as a core network device, a wireless relay device and a wireless backhaul device, which are not shown in FIG. 1. The number of network devices and the number of terminals included in the wireless communication system are not limited in the embodiments of the disclosure.

It is further understood that the wireless communication system of the embodiments of the disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance (CSMS/CA). Depending on factors such as capacity, rate, and delay of different networks, the networks can be classified as a second Generation (2G) network, a 3G network, a 4G network, or a future evolved network, such as a 5G network, which can also be called a new radio (NR) network. For easy of description, in this disclosure, sometimes the wireless communication network may referred to as a network for short.

The network device involved in the disclosure may also be referred to as a radio access network device. The radio access network device may be: a base station, an evolved base station (evolved node B, i.e., eNB), a femtocell, an access point (AP) in a wireless fidelity (WI-FI) system, a radio relay node, a radio backhaul node, a transmission point (TP) or a transmission and reception point (TRP), a gNB in an NR system, or components or a part of the devices that constitute the base station. The network device may also be a vehicle-mounted device in a vehicle to everything (V2X) communication system. It should be understood that the specific technology and the specific device form used by the network device are not limited in the embodiments of the disclosure.

The terminal involved in the disclosure may also be referred to as a terminal device, user equipment (UE), a mobile station (MS), or a mobile terminal (MT), which is a device that provides voice and/or data connectivity to a user. For example, the terminal can be a handheld device or a vehicle-mounted device with a wireless connectivity function. For example, currently, the terminals include a mobile phone, a pocket personal computer (PPC), a handheld computer, a personal digital assistant (PDA), a laptop, a tablet computer, a wearable device, or a vehicle-mounted device, etc. In addition, the terminal device may also be a vehicle-mounted device in the V2X communication system. It should be understood that the specific technology and the specific device form used by the terminal are not limited in the embodiments of this disclosure.

In the related art, radio resource management (RRM) measurement for a connected state or RRM measurement for a non-connected state may be performed. The RRM measurement for the connected state is driven by a network. The NR system sends measurement configuration information to a terminal in the connected state via a radio resource control (RRC) message (e.g., an RRC reconfiguration message), or an RRC resume message. The terminal performs RRM measurement based on the measurement configuration information, and reports a measurement result to the network. The measurement configuration information includes: a measurement ID, a measurement object, a report configuration, a measurement amount configuration, a measurement starting threshold, a measurement interval, and so on. The following context mainly describes the measurement mechanism based on three of the elements, i.e., the measurement ID, the measurement object, and the report configuration.

The measurement ID is an individual ID that associates a particular measurement object with a particular report configuration. If the terminal reaches the measurement starting threshold, the terminal determines whether to perform this type of measurement based on the presence or absence of the measurement ID.

The measurement object defines an object of measurement (a frequency of measurement), such as a frequency of a current serving cell or a frequency of a neighboring cell. The measurement object also includes a measurement object ID and a specific configuration of the corresponding measurement object, such as a measurement cycle and a window length (smtc) of each measurement. Currently, RRM measurement for the connected state supports measurement of two types of pilot signals, i.e., a Synchronization Signal and Physical broadcast channel (PBCH) block (SSB) at a certain frequency or a Channel State Information Reference Signal (CSI-RS) can be measured. A NR measurement object may contain SSB configuration only or CSI-RS configuration only, or both of them.

The report configuration defines a measurement report criterion, which includes a measurement report ID and corresponding specific measurement report configuration. In general, the report configuration can be divided into two types: event-triggered reporting and cycle-triggered reporting. The event-triggered reporting includes an event type and a corresponding threshold, and a duration of satisfying a trigger condition. In response to the configured trigger event being satisfied, a measurement result is reported to the network. The cycle-triggered reporting includes a reporting cycle and a count of reporting, and the terminal periodically reports measurement results to the terminal.

For a measurement rules, each group of measurements are associated and configured by index. A general index is the measurement ID, and all measurements are arranged according to an association relation of measurement IDs and are sent to the terminal from the network side. Each measurement ID is associated with a measurement object and a report configuration, which indicates that the measurement object to be measured and the report configuration corresponding to the measurement ID are combined together. Measurement objects and report configurations that are not associated with any measurement ID can also be sent to the terminal, but the terminal does not perform any type of measurement for these configurations.

Figure 2:
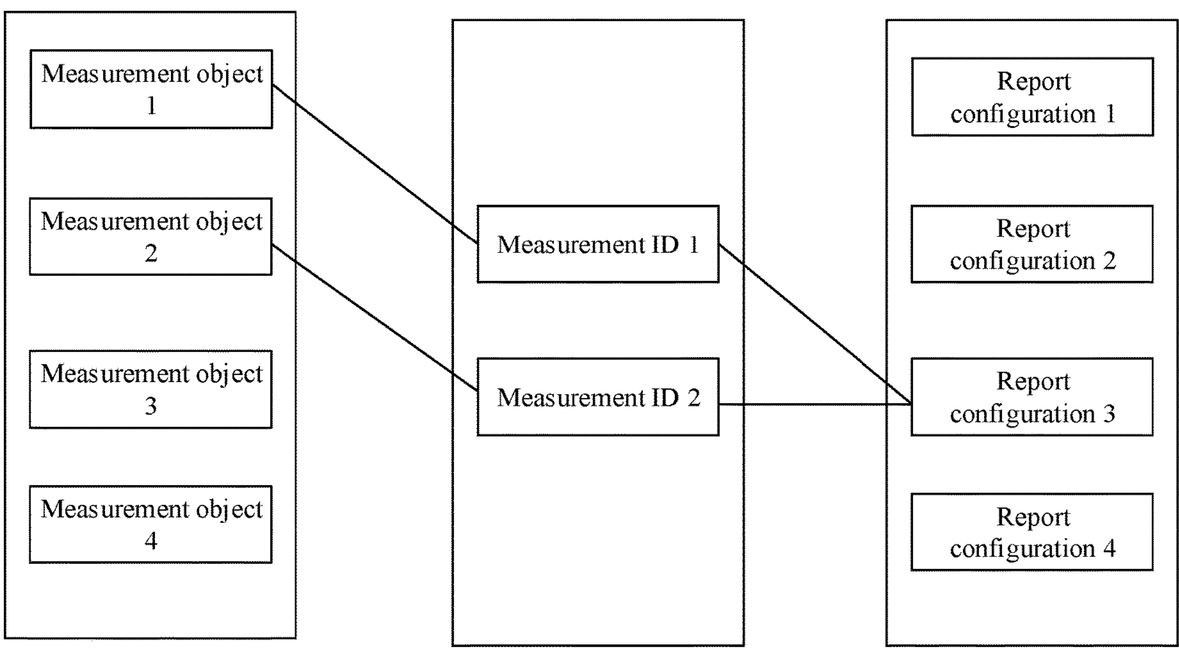
FIG. 2 is a schematic diagram of binding relations between measurement identifiers (IDs), measurement objects, and report configurations according to an exemplary embodiment.

FIG. 2 is a schematic diagram of binding relations between measurement IDs, measurement objects, and report configurations according to an exemplary embodiment. As illustrated in FIG. 2, in the measurement configuration information of the terminal, Measurement IDs 1 and 2 are associated with Measurement objects and Report configurations, the terminal may use Measurement object 1 and Report configuration 3 to perform Measurement 1, and use Measurement object 2 and Report configuration 3 to perform Measurement 2. For example, Measurement object 2 is a frequency of a neighboring cell, and Report configuration 3 is a trigger event of event A3. When the terminal measures signal qualities of a serving cell and the neighboring cell, and finds that the signal quality of the neighboring cell is greater than that of the serving cell, the event A3 is triggered and a measurement report process is also triggered. The terminal reports Measurement ID 2, an ID of a triggered cell, and the signal quality to the network for reference of the network to determine whether or not to send a handover command. It is worth noting that any measurement object not paired with a measurement ID may not be measured, i.e., the RRM measurement of the terminal is performed according to the matched measurement ID.

FIG. 3 is a schematic diagram of an overall process for a terminal to perform RRM measurement according to an exemplary embodiment. As illustrated in FIG. 3, when the terminal enters a connected state, a network sends measurement configuration information to the terminal via an RRC message, and the terminal performs measurement according to the above RRM measurement rule. If the report configuration is cycle-triggered reporting, the terminal reports the measurement results to the network in accordance with the cycle. If the report configuration is event-triggered reporting, the terminal is triggered to report a measurement result to the network when it determines that a measurement event is satisfied according to the measurement result.

In the related art, in order to save power consumption of the terminal, the RRM measurement relaxation mechanism is introduced for the terminal in the idle state in the Rel-16 standard. In the measurement relaxation mechanism, communication is based on a measurement relaxation criterion. In the related art, the measurement relaxation criterion includes a non-cell edge criterion, a low mobility criterion, and a stationary criterion.

The low mobility criterion may be as following. If a difference between a reference signal reception strength ($S_{rxlevRef}$) and a signal strength ($S_{rxlev}$) of a current serving cell of the terminal is less than a preset threshold value ($S_{SearchDeltaP}$) for a certain period of time ($T_{SearchDeltaP}$), it means that a signal change amplitude of the terminal is not significant, and it is determined that the terminal is in a low mobility state currently. The parameters $S_{SearchDeltaP}$, $T_{SearchDeltap}$ are provided by the network and the equation is agreed by a protocol.

The non-cell edge criterion may be as following. If the signal reception strength ($S_{rxlev}$) of the current serving cell of the terminal is greater than a preset threshold value ($S_{searchThresholdP}$) and (if configured) a signal reception quality ($S_{qual}$) is greater than a preset threshold value ($S_{searchThresholdQ}$), it is determined that the terminal is not at a cell edge. The parameters $S_{SearchDeltaP}$, $T_{SearchDeltap}$ are configured by the network and the equation is agreed by a protocol.

The stationary criterion may be as following. Within a certain period of time ($T_{SearchDeltaP\_stationary}$), if a difference between the signal reception strength ($S_{rxlev}$) of the current serving cell of the terminal and a reference signal reception strength ($S_{rxlevRef}$) is less than the preset threshold value ($S_{SearchDeltaP\_stationary}$), and (if configured) in the period of time, the number of beam switchings of the terminal is less than a threshold ($N_{beam\_switching}$), it is determined that the signal change amplitude of the terminal is not significant and no beam switching occurs, and the terminal is determined to be in a stationary state. The parameters $T_{SearchDeltaP\_stationary}$, $S_{SearchDeltaP\_stationary}$, $N_{beam\_switching}$ are provided by the network and the equation is agreed by a protocol.

Currently, the RRM measurement relaxation is further studied in the 3rd Generation Partnership Project (3GPP) Rel-17 standard, the RRM measurement relaxation is further studied and introduced to the situation of the connected state, particularly under a Reduced capability (Redcap) terminal device type by considering introduction of a higher level measurement relaxation criterion, i.e., the stationary criterion, and introducing the RRM measurement relaxation to the connected state. When the RRM measurement relaxation is designed for RedCap devices in the Rel-17 standard, it is highly likely that it may be introduced for use in enhanced Mobile Broad Band (eMBB) devices (relative to conventional terminals such as cellular phones) in NR.

However, it can be seen from the RRM measurement mechanism for the connected state, the terminal may not, to a large extent, perform the measurement or make judgments on its own, as it does in the non-connected state, but may only perform the measurement according to the measurement configuration of the network and report the measurement result to the network. Therefore, when the current measurement relaxation criterion for the non-connected state is introduced for use in the connected state, a measurement relaxation criterion design for the connected state is required.

The embodiments of the disclosure provide a communication method based on a measurement relaxation mechanism for a connected state, i.e., provide a method for use a measurement relaxation criterion in an RRC connected state.

In an implementation, a network device provides measurement relaxation criterion information to a terminal in a connected state, and the terminal performs a measurement relaxation mechanism-based communication based on the measurement relaxation criterion information.

FIG. 4 is a flowchart of a communication method based on a measurement relaxation mechanism according to an exemplary embodiment. The method may be performed alone or in combination with other embodiments of the disclosure. As illustrated in FIG. 4, the method is performed by a terminal and includes the following steps.

At step S11, measurement relaxation criterion information sent by a network device is obtained, in which the measurement relaxation criterion information indicating a measurement relaxation criterion for performing measurement relaxation when a terminal is in a connected state.

In the embodiments of the disclosure, the network device may provide RRM measurement relaxation criterion information for the terminal in the connected state and send the RRM measurement relaxation criterion information to the terminal. The terminal obtains the measurement relaxation criterion information sent by the network device, and performs measurement relaxation mechanism-based communication, in the connected state, according to the measurement relaxation criterion information.

In an implementation, the measurement relaxation criterion includes one or more combinations of a non-cell edge criterion, a low mobility criterion, and a stationary criterion.

The terminal may obtain the measurement relaxation criterion information sent by the network device based on a RRC dedicated signaling, or the terminal may obtain the measurement relaxation criterion information broadcasted by the network device based on a system message.

The RRM measurement relaxation criterion information provided by the network device to the terminal in the embodiments of the disclosure may be measurement configuration information configured based on measurement configuration of the connected state. The RRM measurement relaxation criterion information may also be a measurement relaxation criterion parameter required for the terminal to perform measurement relaxation directly provided by the network device.

In an implementation, if the terminal receives the measurement relaxation criterion parameter or the measurement configuration containing a measurement relaxation criterion provided by both the broadcasted system message and the RRC dedicated signaling or the measurement configuration containing the measurement relaxation criterion, the measurement relaxation criterion information provided by the RRC dedicated signaling is used.

In the embodiments of the disclosure, firstly, the RRM measurement relaxation criterion information provided by the network device for the terminal is illustrated by taking the measurement configuration information configured based on the measurement configuration of the connected state as an example.

FIG. 5 is a flowchart of a communication method based on a measurement relaxation mechanism according to an exemplary embodiment. The method may be performed alone or in combination with other embodiments of the disclosure. As illustrated in FIG. 5, the method is performed by a terminal and includes the following steps.

At step S21, measurement configuration information configured by the network device is obtained, the measurement configuration information indicating the measurement relaxation criterion information.

In the embodiment of the disclosure, the measurement configuration information in an implementation is for the terminal in the connected state, so that the terminal can communicate and interact with the network device, and can obtain the measurement configuration information configured by the network device based on an RRC dedicated signaling.

In an implementation, the measurement configuration information includes one or more sets of measurement configuration information. Each set of measurement configuration information in the one or more sets of measurement configuration information includes a measurement ID, a measurement object, and a report configuration. The measurement object in the measurement configuration information indicating the measurement relaxation criterion information in the embodiment of the disclosure is a serving cell measurement object (servingCellMO) having a binding relation with the measurement ID. The report configuration is a report configuration that has a binding relation with the measurement ID, and the report configuration includes a trigger event for the measurement relaxation criterion.

In the embodiments of the disclosure, the trigger event for the measurement relaxation criterion included in the measurement configuration may be understood to be a new trigger event, which may be referred to as an event D, designed for the terminal in the connected state to perform communication based on the measurement relaxation mechanism.

The event D may be a permutation of the non-cell edge criterion/the low mobility criterion/the stationary criterion, which includes a parameter for the corresponding criterion and an equation for the relaxation criterion.

In an implementation, the trigger event includes an entry condition and an exit condition for implementing the measurement relaxation criterion, an entry parameter corresponding to the entry condition, and an exit parameter corresponding to the exit condition.

In an example, a new trigger event is designed to be an event D1 corresponding to the low mobility criterion, and a corresponding entry condition may be provided as follows:

the low mobility criterion is satisfied, when:

$(S_{rxlevRef}-S_{rxlev})<S_{SearchDeltaP}$, in which, $S_{rxlev}$=signal reception strength (dB) of the current serving cell.

$S_{rxlevRef}$=reference signal reception strength (dB) of the current serving cell, which is set as follows:

after switching occurs, or if $(S_{rxlev}-S_{rxlevRef})>0$, or if the criterion is not satisfied within $T_{SearchDeltaP}$:

setting $S_{rxlevRef}$ as the current $S_{rxlev}$.

A corresponding exit condition may be provided as follows:

UE satisfies the low mobility criterion, when:

$(S_{rxlevRef}-S_{rxlev})>S1_{SearchDeltaP}$, in which:

$S_{rxlev}$=signal reception strength (dB) of the current serving cell, $S_{rxlevRef}$=reference signal reception strength (dB) of the current serving cell, which is set as follows:

after switching occurs, or if $(S_{rxlev}-S_{rxlevRef})>0$, or if the criterion is not satisfied within T SearchDeltaP:

$S_{rxlevRef}$ is set as the current $S_{rxlev}$.

There is a special case that $S_{SearchDeltaP}$ is equal to $S1_{SearchDeltaP}$.

In another example, a new trigger event is designed as an event D2 corresponding to the non-cell edge criterion, with a corresponding entry condition as:

the non-cell edge criterion is satisfied, when:

$S_{rxlev} > S_{SearchThresholdP}$, and $S_{qual} > S_{SearchThresholdQ}$, if $S_{SearchThresholdQ}$ is configured, in which, $S_{rxlev}$=signal reception strength (dB) of the current serving cell, $S_{qual}$=signal reception quality (dB) of the current serving cell.

The corresponding exit condition is provided as follows: the non-cell edge criterion is satisfied, when:

$S_{rxlev} < S1_{SearchThresholdP}$, and $S_{qual} < S1_{SearchThresholdQ}$, if $S_{SearchThresholdQ}$ is configured, in which:

$S_{rxlev}$=signal reception strength (dB) of the current serving cell, $S_{qual}$=signal reception quality (dB) of the current serving cell.

There is a special case that $S_{SearchThresholdP}$ is equal to $S1_{SearchThresholdP}$.

In yet another example, a new trigger event is designed as an event D3, corresponding to the stationary criterion, the corresponding entry condition is provided as follows:

the stationary criterion is satisfied, when:

$(S_{rxlevRef} - S_{rxlev}) < S_{SearchDeltaP\_stationary}$, and the number of Beam switchings<$N_{beam\_switching}$, if $N_{beam\_switching}$ is configured, in which, $S_{rxlev}$=signal reception strength (dB) of the current serving cell, $S_{rxlevRef}$=reference signal reception strength (dB) of the current serving cell, which is set as follows:

after switching occurs, or if $(S_{rxlev} - S_{rxlevRef}) > 0$, or if the criterion is not satisfied within the $T_{SearchDeltaP\_stationary}$:

SrxlevRef is set to the current $S_{rxlev}$, and $N_{beam\_switching}$ is reset to 0.

The corresponding exit condition is provided as follows: the stationary criterion is satisfied, when:

$(S_{rxlevRef} - S_{rxlev})$>S1SearchDeltaP_stationary, or the number of beam switchings>N1beam_switching, if $N_{beam\_switching}$ is configured, in which:

$S_{rxlev}$=signal reception strength (dB) of the current serving cell, $S_{rxlevRef}$=reference signal reception strength (dB) of the current serving cell, which is set as follows:

after switching occurs, or if $(S_{rxlev} - S_{rxlevRef}) > 0$, or if the criterion is not satisfied within the $T_{SearchDeltaP\_stationary}$.

$S_{rxlevRef}$ is set to the current $S_{rxlev}$, and $N_{beam\_switching}$ is reset to 0.

There is a special case that $S_{SearchDeltaP\_stationary}$ is equal to $S1_{SearchDeltaP\_stationary}$, and $N_{beam\_switching}$ is equal to $N1_{beam\_switching}$.

In yet another example, a new trigger event is designed to be an event D4 corresponding to configuring both the low mobility criterion and the non-cell edge criterion, which is configured as a combination of the two embodiments of the low mobility criterion and the non-cell edge criterion described above. The entry condition is that entry conditions of both criteria are satisfied, and the exit condition is that any one of the criteria satisfies the exit condition.

In yet another example, a new trigger event is designed to be an event D5 corresponding to configuring both the stationary criterion and the non-cell edge criterion, which is configured as a combination of the two embodiments of the stationary criterion and the non-cell edge criterion described above. The entry condition is that entry conditions of both criteria are satisfied, and the exit condition is that any one of the criteria satisfies the exit condition.

In the embodiment of the disclosure, in case of obtaining the measurement criterion information based on the measurement configuration, after obtaining the measurement ID included in the measurement configuration information, the terminal may perform RRM measurement based on the measurement ID, e.g., performing the RRM measurement on a serving cell measurement object bound to the measurement ID.

FIG. 6 is a flowchart of a communication method based on a measurement relaxation mechanism according to an exemplary embodiment. The method may be performed alone or in combination with other embodiments of the disclosure. As illustrated in FIG. 6, the method is performed by a terminal and includes the following steps.

At step S31, RRM measurement is performed on a serving cell measurement object bound to a measurement ID based on the measurement ID.

In the embodiments of the disclosure, it may be determined whether a measurement result satisfies an entry condition of the measurement relaxation criterion based on an RRM measurement result, and the entry conditions of the measurement relaxation criterion involved in the related embodiments described above.

At step S32, in response to a measurement result satisfying an entry condition, a measurement report process is triggered.

In an implementation, the RRM measurement for measurement relaxation is performed after determining that the measurement result satisfies the entry condition, and the RRM measurement is continued to be performed on the serving cell measurement object based on the measurement ID, to determine whether the exit condition for measurement relaxation criterion is satisfied. In response to the measurement result satisfying the exit condition, the RRM measurement relaxation is stopped, and/or the measurement report process is triggered.

FIG. 7 is a flowchart of a communication method based on a measurement relaxation mechanism according to an exemplary embodiment. The method may be performed alone or in combination with other embodiments of the disclosure. As illustrated in FIG. 7, the method is performed by a terminal and includes the following steps.

At step S41, RRM measurement is performed on a serving cell measurement object bound to a measurement ID based on the measurement ID.

At step S42, in response to a measurement result satisfying an entry condition, a measurement report process is triggered.

At step S43, the RRM measurement is continued to be performed on the serving cell measurement object based on the measurement ID, and in response to the measurement result satisfying an exit condition, the RRM measurement relaxation is stopped, and/or the measurement report process is triggered.

That is, in the embodiments of the disclosure, when the terminal satisfies the entry condition, the terminal continues to perform the RRM measurement in accordance with the measurement ID in the measurement configuration, and makes a determination on the exit condition, and when the exit condition is satisfied, the terminal performs the following operations:

a. stopping an RRM measurement relaxation state and (if configured) triggering the measurement report process, or b. triggering the measurement report process.

In the above embodiments of the disclosure, in the implementation of determining the measurement relaxation criterion information based on the measurement configuration mode when the terminal is in the connected state, triggering measurement report process is mentioned, which is not limited in the disclosure, and the current NR legacy mechanism can be adopted. That is, the terminal that satisfies the condition reports the triggered measurement ID (the measurement ID is a measID, and the network can know which type of event triggers the measurement) and the signal quality of the cell to the network through the report process.

In the embodiments of the disclosure, the measurement relaxation criterion information for the connected state can be determined based on the measurement configuration method for the connected state of the terminal, so that in the connected state, communication based on the measurement relaxation mechanism is realized based on the measurement relaxation criterion information.

In the above implementations, the terminal determines whether or not to perform the RRM measurement for measurement relaxation by performing the judgment of measurement relaxation criterion based on the acquired measurement configuration information.

In another implementation of the embodiment of the disclosure, the terminal may perform measurement based on the acquired measurement configuration information, and periodically report the measurement result of performing the RRM measurement on the serving cell measurement object based on the measurement configuration information. The network device acquires the measurement result reported periodically by the terminal, and may determine, based on the measurement result, whether the terminal uses the measurement relaxation mechanism for communication, and determine the measurement relaxation criterion used.

In the embodiment of the disclosure, the measurement relaxation criterion information obtained by the terminal may be determined based on a measurement relaxation criterion parameter directly provided by the network device.

Embodiments of the disclosure are described below with respect to an implementation solution in which the network device provides the measurement relaxation criterion parameter used by the terminal to perform measurement relaxation.

FIG. 8 is a flowchart of a communication method based on a measurement relaxation mechanism according to an exemplary embodiment. The method may be performed alone or in combination with other embodiments of the disclosure. As illustrated in FIG. 8, the method is performed by a terminal and includes the following steps.

At step S51, a measurement relaxation criterion parameter required for the terminal to perform the measurement relaxation sent by a network device is obtained.

In the embodiment of the disclosure, the network device may configure the measurement relaxation criterion parameter corresponding to the measurement relaxation criterion in a system message or an RRC dedicated signaling. The terminal acquires the measurement relaxation criterion parameter required for the terminal to perform measurement relaxation sent by the network device based on the system message or the RRC dedicated signaling.

In an example, if the network supports the terminal to use a stationary measurement relaxation criterion, an Information Element (IE) parameter of the stationary criterion is added in a system message X (SIBX, i.e., any SIB). For example, parameters such as $T_{SearchDeltaP\_stationary}$, $S_{SearchDeltaP\_stationary}$, $N_{beam\_switching}$, etc. may be added.

In another embodiment, if the network supports the terminal to use the non-cell edge criterion, an IE parameter of the non-cell edge criterion is added in an RRC reconfiguration message. For example, parameters such as $S_{SearchThresholdP}$, $S_{SearchThresholdQ}$, etc. may be added.

In the embodiment of the disclosure, after receiving the measurement relaxation parameter provided by the system message or the RRC dedicated message in the connected state, the terminal may perform the RRM measurement on the serving cell based on the measurement relaxation criterion parameter, and may determine whether to perform measurement relaxation according to the corresponding measurement relaxation criterion based on a measurement result.

Figures 9, 10:
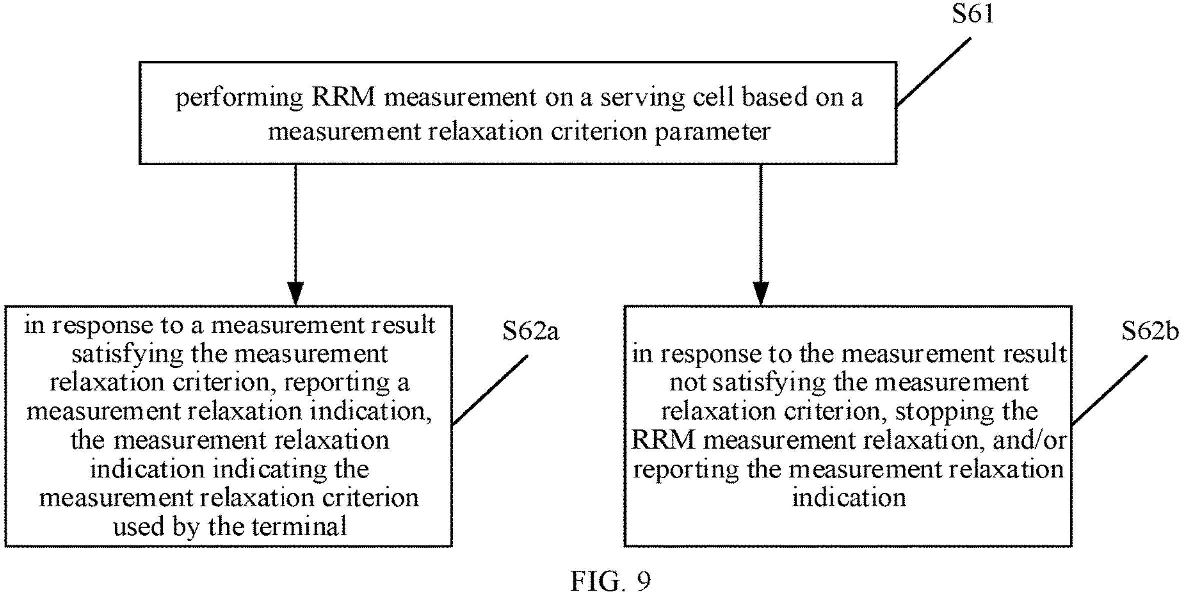
FIG. 9 is a flowchart of a communication method based on a measurement relaxation mechanism according to an exemplary embodiment.
FIG. 10 is a flowchart of a communication method based on a measurement relaxation mechanism according to an exemplary embodiment.

FIG. 9 is a flowchart of a communication method based on a measurement relaxation mechanism according to an exemplary embodiment. The method may be performed alone or in combination with other embodiments of the disclosure. As illustrated in FIG. 9, the method is performed by a terminal and includes the following steps.

At step S61, RRM measurement is performed on a serving cell based on a measurement relaxation criterion parameter.

At step S62*a*, in response to a measurement result satisfying the measurement relaxation criterion, a measurement relaxation indication is reported, the measurement relaxation indication indicating the measurement relaxation criterion used by the terminal.

In an example, in the embodiment of the disclosure, if the terminal determines that the measurement relaxation criterion is satisfied based on the measurement result, it reports a measurement relaxation indication via an RRC message to indicate the measurement relaxation criterion that is satisfied. For example, the measurement relaxation indication may be used to indicate one or more of: the low mobility criterion being satisfied, the non-cell edge criterion being satisfied, both the low mobility criterion and the non-cell edge criterion being satisfied, the stationary criterion being satisfied, both the stationary criterion and the non-cell edge criterion being satisfied.

In an example, the network device may configure a new IE parameter for a RRC message-measurement report, which can be used by the UE to carry the measurement relaxation indication in a measurement report when the UE satisfies the measurement relaxation criterion, to report the measurement relaxation indication to the network.

In another example, the network adds a new RRC message-measurement relaxation indication for the terminal, to report the RRC message to the network when the terminal satisfies the measurement relaxation criterion.

At step S62*b*, in response to a measurement result not satisfying the measurement relaxation criterion, the RRM measurement relaxation is stopped, and/or the measurement relaxation indication is reported.

In the case where the measurement result does not satisfy the measurement relaxation criterion, reporting the measurement relaxation indication may be performed in a similar way as the implementation of reporting the measurement criterion in the above embodiments.

In the embodiments of the disclosure, the terminal obtains the measurement relaxation criterion information sent by the network device, and realizes the communication method based on the measurement relaxation mechanism in the connected state based on the measurement relaxation criterion information.

Based on the same inventive concepts, the embodiment of the disclosure also provides a communication method based on a measurement relaxation mechanism, which is performed by a network device.

FIG. 10 is a flowchart of a communication method based on a measurement relaxation mechanism according to an exemplary embodiment. The method may be performed alone or in combination with other embodiments of the disclosure. As illustrated in FIG. 10, the method is performed by a network device and includes the following steps.

At step S71, measurement relaxation criterion information is sent, the measurement relaxation criterion information indicating a measurement relaxation criterion for performing measurement relaxation when a terminal is in a connected state.

The measurement relaxation criterion includes one or more combinations of a non-cell edge criterion, a low mobility criterion, and a stationary criterion.

In an implementation, the network device may configure measurement configuration information and send the configured measurement configuration information. That is, RRM measurement relaxation criterion information provided by the network device to the terminal may be measurement configuration information configured based on measurement configuration of the connected state.

When the network device sends the measurement configuration information for indicating the measurement relaxation criterion information based on the measurement configuration of the connected state, it can send the configured measurement configuration information based on the RRC dedicated signaling.

In an implementation, the measurement configuration information includes one or more sets of measurement configuration information. Each set of measurement configuration information in the one or more sets of measurement configuration information includes a measurement ID, a serving cell measurement object having a binding relation with the measurement ID, and a report configuration having a binding relation with the measurement ID. The report configuration includes a trigger event for the measurement relaxation criterion.

The trigger event includes an entry condition and an exit condition for implementing the measurement relaxation criterion, an entry parameter corresponding to the entry condition, and an exit parameter corresponding to the exit condition.

In an implementation, the network device may directly provide a measurement relaxation criterion parameter required for the terminal to perform the measurement relaxation to the terminal. That is, the network device may send the measurement relaxation criterion parameter required for the terminal to perform the measurement relaxation.

When the network device sends the measurement relaxation criterion parameter required for the terminal to perform the measurement relaxation, it may send the measurement relaxation criterion parameter required for the terminal to perform the measurement relaxation based on a system message or an RRC dedicated signaling.

In an implementation, after receiving the measurement relaxation parameter provided by the system message or a RRC dedicated message in the connected state, the terminal may perform RRM measurement on a serving cell based on the measurement relaxation criterion parameter. Based on a measurement result, the terminal may perform measurement relaxation judgment according to the corresponding measurement relaxation criterion, and report a measurement relaxation indication when performing the measurement relaxation. The network device may obtain the measurement relaxation indication reported by the terminal, and the measurement relaxation indication indicates the measurement relaxation criterion used by the terminal.

In an implementation, the network device may obtain an RRM measurement result reported periodically by the terminal, and determine whether the terminal uses the measurement relaxation mechanism for communication based on the RRM measurement result, and determine the measurement relaxation criterion used.

In the communication method based on a measurement relaxation mechanism provided by the embodiments of the disclosure, the network device configures and sends the measurement relaxation criterion information to indicate the measurement relaxation criterion for performing the measurement relaxation when the terminal is in the connected state. The terminal obtains the measurement relaxation criterion information and may communicate based on the measurement relaxation mechanism according to the measurement relaxation criterion information when in the connected state.

It is understood that configuring and sending the measurement relaxation criterion information by the network device is similar to that in the process of realizing the measurement relaxation mechanism when the terminal is in the connected state in the above embodiments, which can be referred to the relevant descriptions of the above embodiments, and will not be described in detail herein.

It is further understood that the communication method based on the measurement relaxation mechanism provided by the embodiments of the disclosure can be applied to a scenario in which the terminal and the network device interact with each other to implement the communication method based on the measurement relaxation mechanism. The functions realized by the terminal and the network device involved in the specific implementation process can be referred to the relevant descriptions involved in the above embodiments, and will not be described in detail herein.

It is noted that, it can be understood by those skilled in the art that various embodiments/implementations involved in the embodiments of the disclosure can be used in combination with the foregoing embodiments or can be used independently. Whether they are used alone or together with the foregoing embodiments, the realization principles are similar. Some of the embodiments of the disclosure are illustrated as implementations used together. Certainly, those skilled in the art can understand that such illustrative descriptions are not considered as a limitation of the embodiments of the disclosure.

Based on the same ideas, the embodiments of the disclosure also provide a communication apparatus based on a measurement relaxation mechanism.

It is understood that the communication apparatus based on a measurement relaxation mechanism provided by the embodiments of the disclosure includes hardware structures and/or software modules for performing respective functions in order to achieve the above functions. In combination with the units and algorithmic steps of the various examples disclosed in the embodiments of the disclosure, the embodiments of the disclosure can be implemented in the form of hardware or a combination of hardware and computer software. Whether a particular function is performed by hardware or by a way of driving hardware by computer software depends on the particular application and design constraints of the technical solution. Those skilled in the art may use different methods for each particular application to implement the described functions, but such implementation should not be considered as beyond the scope of the technical solutions of the embodiments of the disclosure.

Figure 11:
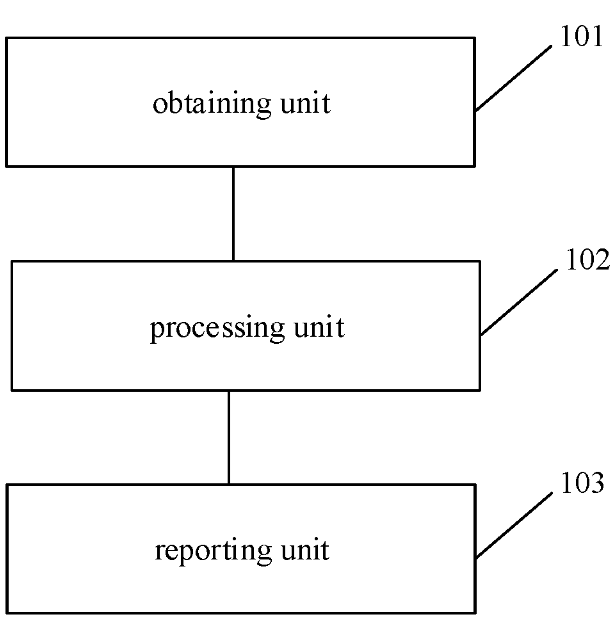
FIG. 11 is a block diagram of a communication apparatus based on a measurement relaxation mechanism according to an exemplary embodiment.

FIG. 11 is a block diagram of a communication apparatus 100 based on a measurement relaxation mechanism according to an exemplary embodiment. As illustrated in FIG. 11, the communication apparatus 100 based on a measurement relaxation mechanism is applied to a terminal. The apparatus 100 includes: an obtaining unit 101.

The obtaining unit 101 is configured to obtain measurement relaxation criterion information sent by a network device, in which the measurement relaxation criterion information indicating a measurement relaxation criterion for performing measurement relaxation when the terminal is in a connected state.

In an implementation, the obtaining unit 101 obtains measurement configuration information configured by the network device.

In an implementation, the obtaining unit 101 obtains the measurement configuration information configured by the network device based on an RRC dedicated signaling.

In an implementation, the measurement configuration information includes one or more sets of measurement configuration information; and each set of measurement configuration information in the one or more sets of measurement configuration information includes a measurement ID, a serving cell measurement object having a binding relation with the measurement ID, and a report configuration having a binding relation with the measurement ID, in which the report configuration includes a trigger event for the measurement relaxation criterion.

In an implementation, the trigger event includes an entry condition and an exit condition for implementing the measurement relaxation criterion, an entry parameter corresponding to the entry condition, and an exit parameter corresponding to the exit condition.

In an implementation, the measurement relaxation criterion includes one or more combinations of a non-cell edge criterion, a low mobility criterion, and a stationary criterion.

In an implementation, the apparatus 100 further includes: a processing unit 102. The processing unit 102 is configured to: perform RRM measurement on the serving cell measurement object based on the measurement ID; and in response to a measurement result satisfying the entry condition, trigger a measurement report process.

In an implementation, the apparatus 100 further includes: the processing unit 102. The processing unit 102 is configured to: in response to the measurement result satisfying the entry condition, perform the RRM measurement on the serving cell measurement object based on the measurement ID; and in response to the measurement result satisfying the exit condition, stop RRM measurement relaxation, and/or trigger the measurement report process.

In an implementation, the obtaining unit 101 is configured to: obtain a measurement relaxation criterion parameter required for the terminal to perform the measurement relaxation sent by the network device.

In an implementation, the obtaining unit 101 is configured to: obtain the measurement relaxation criterion parameter required for the terminal to perform the measurement relaxation sent by the network device based on a system message or RRC dedicated signaling.

In an implementation, the apparatus 100 further includes: the processing unit 102 and a reporting unit 103. The processing unit 102 performs RRM measurement on a serving cell based on the measurement relaxation criterion parameter. In response to a measurement result satisfying the measurement relaxation criterion, the reporting unit 103 reports a measurement relaxation indication, the measurement relaxation indication indicating the measurement relaxation criterion used by the terminal.

In an implementation, the apparatus 100 further includes: the processing unit 102 and the reporting unit 103. In response to the measurement result not satisfying the measurement relaxation criterion, the processing unit 102 stops RRM measurement relaxation, and/or the reporting unit 103 reports a measurement relaxation indication.

In an implementation, the apparatus 100 also includes the reporting unit 103. The reporting unit 103 reports an RRM measurement result of performing RRM measurement on a serving cell measurement object based on the measurement configuration information periodically.

Figure 12:
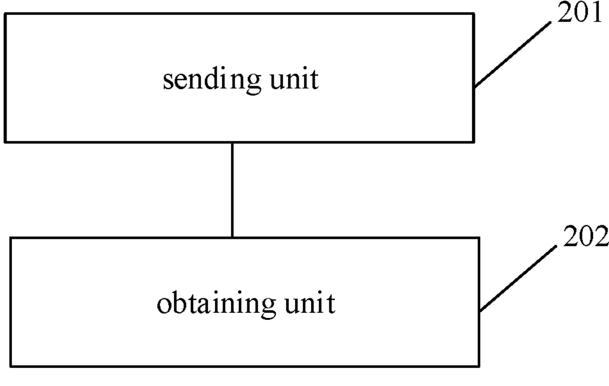
FIG. 12 is a block diagram of a communication apparatus based on a measurement relaxation mechanism according to an exemplary embodiment.

FIG. 12 is a block diagram of a communication apparatus 200 based on a measurement relaxation mechanism according to an exemplary embodiment. As illustrated in FIG. 12, the communication apparatus 200 based on a measurement relaxation mechanism is applied to a network device. The apparatus 200 includes: a sending unit 201.

The sending unit 201 is configured to send measurement relaxation criterion information, in which the measurement relaxation criterion information indicating a measurement relaxation criterion for performing measurement relaxation when a terminal is in a connected state.

In an implementation, the sending unit 201 is configured to: configure measurement configuration information, and send the configured measurement configuration information.

In an implementation, the sending unit 201 is configured to: send the configured measurement configuration information based on a RRC dedicated signaling.

In an implementation, the measurement configuration information includes one or more sets of measurement configuration information; and each set of measurement configuration information in the one or more sets of measurement configuration information includes a measurement ID, a serving cell measurement object having a binding relation with the measurement ID, and a report configuration having a binding relation with the measurement ID, in which the report configuration includes a trigger event for the measurement relaxation criterion.

In an implementation, the trigger event includes an entry condition and an exit condition for implementing the measurement relaxation criterion, an entry parameter corresponding to the entry condition, and an exit parameter corresponding to the exit condition.

In an implementation, the measurement relaxation criterion includes one or more combinations of a non-cell edge criterion, a low mobility criterion, and a stationary criterion.

In an implementation, the sending unit 201 is configured to: send a measurement relaxation criterion parameter required for the terminal to perform measurement relaxation.

In an implementation, the sending unit 201 is configured to: send the measurement relaxation criterion parameter required for the terminal to perform measurement relaxation based on a system message or an RRC dedicated signaling.

In an implementation, the communication apparatus 200 based on a measurement relaxation mechanism also includes an obtaining unit 202. The obtaining unit 202 is configured to: obtain a measurement relaxation indication reported by the terminal, the measurement relaxation indication indicating indicate the measurement relaxation criterion used by the terminal.

In an implementation, the communication apparatus 200 based on a measurement relaxation mechanism also includes the obtaining unit 202. The obtaining unit 202 is configured to: obtain an RRM measurement result reported periodically by the terminal, and determine the measurement relaxation mechanism based on the RRM measurement result.

Regarding the apparatuses in the above embodiments, the specific way in which each module performs its operation has been described in detail in the method embodiments, and will not be described in detail here.

Figure 13:
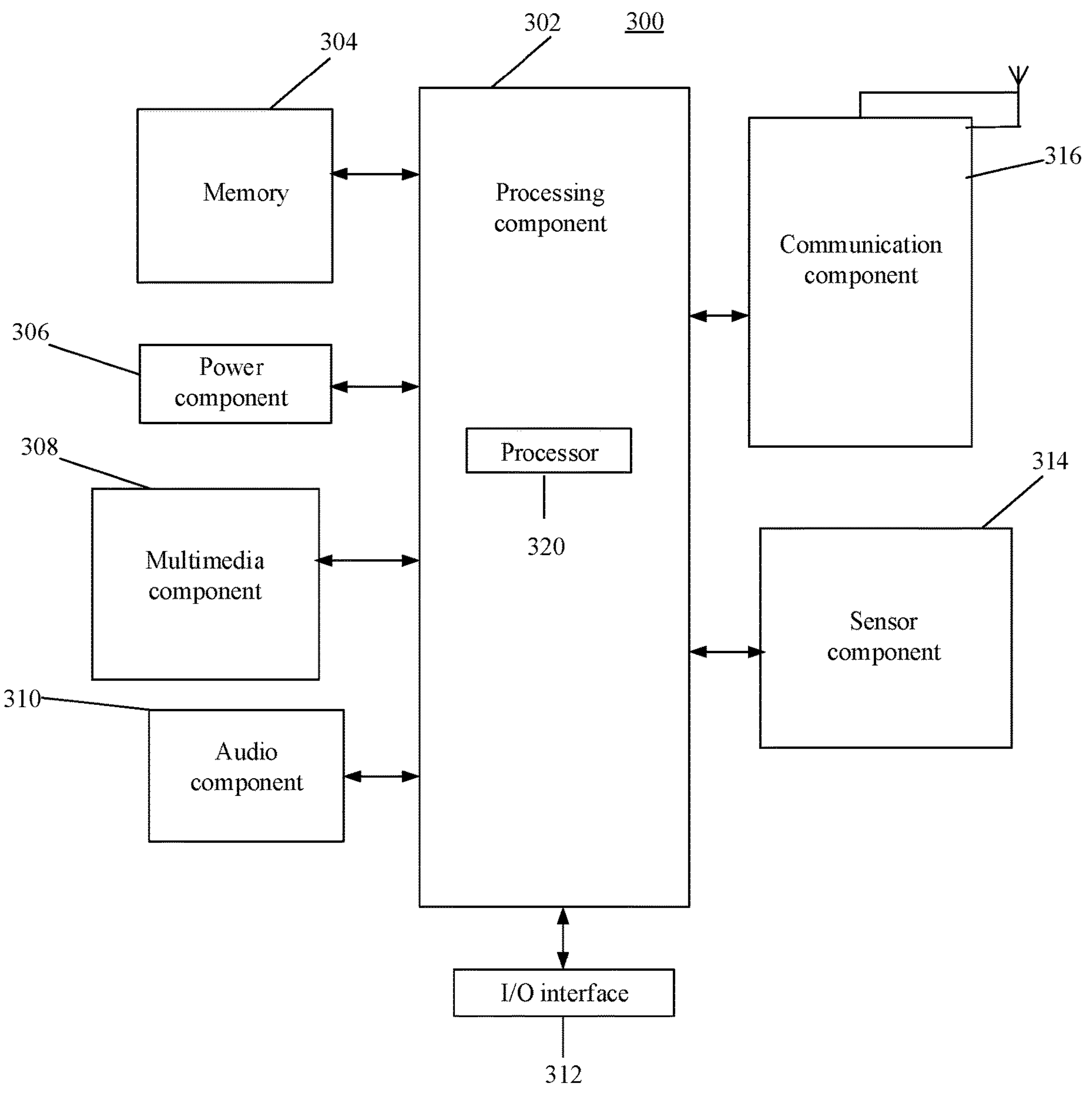
FIG. 13 is a block diagram of a communication device based on a measurement relaxation mechanism according to an exemplary embodiment.

FIG. 13 is a block diagram of a communication device based on a measurement relaxation mechanism according to an exemplary embodiment. For example, the device 300 may be a mobile phone, a computer, a digital broadcasting terminal, a message transceiver device, a game console, a tablet device, a medical device, a fitness device and a PDA.

As illustrated in FIG. 13, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone call, data communication, camera operation, and recording operation. The processing component 302 may include one or more processors 320 to perform instructions to implement all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a calling mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, or 3G, or a combination thereof. In an exemplary embodiment, the communication component 316 receives a broadcast signal from an external broadcast management system or broadcast associated information via a broadcast channel. In an exemplary embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 304, executable by the processor 320 in the device 300, for implementing the above methods. For example, the non-transitory computer-readable storage medium may be a ROM, a Random Access Memory (RAM), a CD-ROM, a magnetic tape, a floppy disc, and an optical data storage device.

Figure 14:
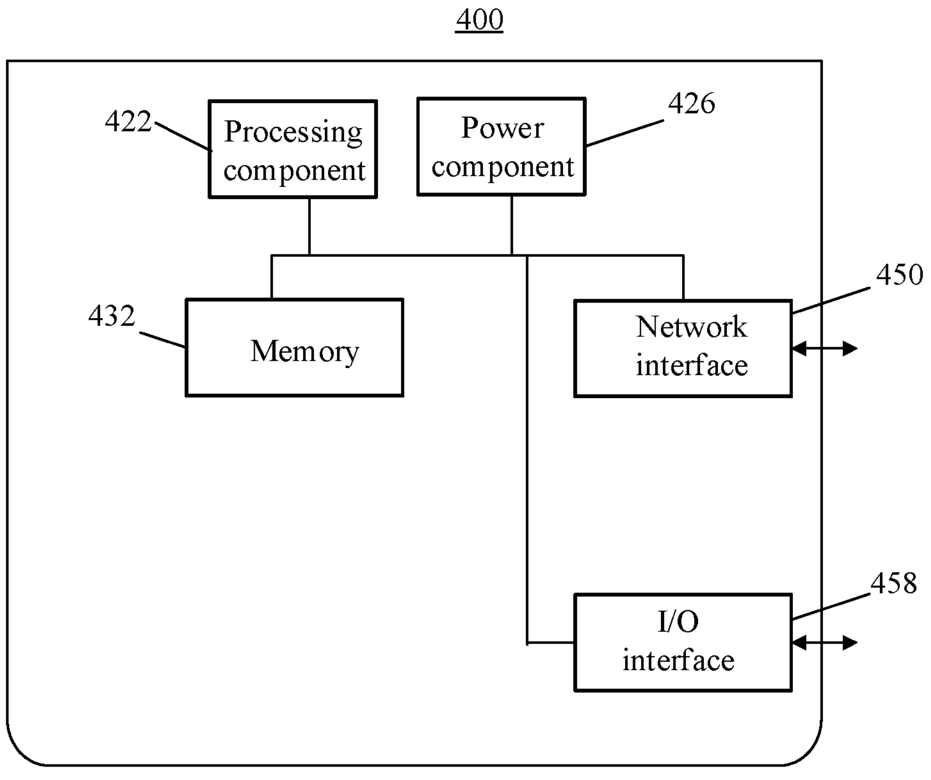
FIG. 14 is a block diagram of a communication device based on a measurement relaxation mechanism according to an exemplary embodiment.

FIG. 14 is a block diagram of a communication device based on a measurement relaxation mechanism according to an exemplary embodiment. For example, the device 400 may be provided as a network device. As illustrated in FIG. 14, the device 400 includes a processing component 422 including one or more processors, and memory resources represented by a memory 432 for storing instructions that can be executed by the processing component 422, such as applications. The application programs stored in the memory 432 may include one or more modules each corresponding to a set of instructions. In addition, the processing component 422 is configured to execute the instructions to perform the methods described above.

The device 400 may also include a power component 426 configured to perform power management of the device 400, a wired or wireless network interface 450 configured to connect the device 400 to a network, and an I/O interface 458. The device 400 may operate on an operating system stored in the memory 432, such as Windows Server™, Mac OS X™, Unix™, Linux™, FreeBSD™, or the like.

In the exemplary embodiments, there is also provided a non-transitory computer readable storage medium including instructions, such as the memory 432, executable by the processor 422 in the device 400, for implementing the above methods. For example, the non-transitory computer-readable storage medium may be a ROM, a RAM, a CD-ROM, a magnetic tape, a floppy disc, and an optical data storage device.

It is further understood that the term "multiple" in the disclosure refers to two or more, which is the similar for other quantifiers. The term "and/or" describes a relation of associated objects, which indicates three relations, for example, "A and/or B" indicates that A exists alone, A and B both exist, and B exists alone. The character "/" generally indicates that the associated objects prior to and after the character "/" is an "or" relation. The terms "a", "said" and "the" in the singular form are also intended to include the plural form, unless the context clearly indicates otherwise.

It is further understood that the terms "first", "second", etc. are used to describe various types of information, but that such information should not be limited to these terms. These terms are used only to distinguish information of the same type from each another and do not indicate a particular order or degree of importance. In fact, the expressions "first" and "second" can be used interchangeably. For example, without departing from the scope of this disclosure, first information may also be referred to as second information, and similarly, second information may also be referred to as first information.

It is further understood that although the operations are depicted in the accompanying drawings in a particular order in the embodiments of the disclosure, this should not be construed as requiring that the operations be performed in the particular sequence shown or in a serial sequence, or that all of the operations shown be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A communication method based on a measurement relaxation mechanism, comprising:

receiving, by a terminal, measurement relaxation criterion information sent by a network device, wherein the measurement relaxation criterion information indicates a measurement relaxation criterion for performing measurement relaxation when a terminal is in a radio resource control (RRC) connected state; and performing, by the terminal, based on the measurement relaxation criterion information, measurement on a serving cell;

in response to a measurement result satisfying the measurement relaxation criterion, performing measurement relaxation and transmitting, by the terminal to the network device via an RRC message, a measurement relaxation indication; and in response to the measurement result no longer satisfying the measurement relaxation criterion, stopping the measurement relaxation and transmitting, by the terminal to the network device via the RRC message, the measurement relaxation indication.

2. The method of claim 1, wherein the measurement relaxation indication indicates whether the terminal satisfies the measurement relaxation criterion and/or indicates the measurement relaxation criterion used by the terminal, and wherein receiving the measurement relaxation criterion information sent by the network device comprises:

obtaining measurement configuration information configured by the network device.

3. The method of claim 2, wherein obtaining the measurement configuration information configured by the network device comprises:

obtaining the measurement configuration information configured by the network device based on a radio resource control dedicated signaling.

4. The method of claim 2, wherein the measurement configuration information comprises one or more sets of measurement configuration information; and each set of measurement configuration information in the one or more sets of measurement configuration information comprises a measurement identifier (ID), a serving cell measurement object having a binding relation with the measurement ID, and a report configuration having a binding relation with the measurement ID, wherein the report configuration comprises a trigger event for the measurement relaxation criterion.

5. The method of claim 4, wherein the trigger event comprises an entry condition and an exit condition for implementing the measurement relaxation criterion, an entry parameter corresponding to the entry condition, and an exit parameter corresponding to the exit condition.

6. The method of claim 5, wherein the measurement relaxation criterion comprises at least one of a non-cell edge criterion, a low mobility criterion, or a stationary criterion.

7. The method of claim 2, further comprising:

reporting a measurement result of performing measurement on a serving cell measurement object based on the measurement configuration information periodically.

8. The method of claim 1, wherein receiving the measurement relaxation criterion information sent by the network device comprises:

obtaining a measurement relaxation criterion parameter required for the terminal to perform the measurement relaxation sent by the network device.

9. The method of claim 8, wherein obtaining the measurement relaxation criterion parameter required for the terminal to perform the measurement relaxation sent by the network device comprises:

obtaining the measurement relaxation criterion parameter required for the terminal to perform measurement relaxation sent by the network device based on a system message or a radio resource control dedicated signaling.

10. The method of claim 1, wherein the measurement relaxation criterion comprises at least one of: a low mobility criterion or a non-cell edge criterion.

11. A communication method based on a measurement relaxation mechanism, performed by a network device, comprising:

sending measurement relaxation criterion information, wherein the measurement relaxation criterion information indicates a measurement relaxation criterion for performing measurement relaxation when a terminal is in a radio resource control (RRC) connected state; and receiving a measurement relaxation indication sent by the terminal via an RRC message;

wherein receiving the measurement relaxation indication sent by the terminal via an RRC message comprises:

in response to a measurement result satisfying the measurement relaxation criterion, performing measurement relaxation by the terminal and receiving via an RRC message, a measurement relaxation indication; and in response to the measurement result no longer satisfying the measurement relaxation criterion, stopping the measurement relaxation by the terminal and receiving via the RRC message, the measurement relaxation indication.

12. The method of claim 11, wherein the measurement relaxation indication indicates whether the terminal satisfies the measurement relaxation criterion and/or indicates the measurement relaxation criterion used by the terminal, and wherein sending the measurement relaxation criterion information comprises:

configuring measurement configuration information, and sending the configured measurement configuration information.

13. The method of claim 12, wherein sending the configured measurement configuration information comprises:

sending the configured measurement configuration information based on a radio resource control dedicated signaling.

14. The method of claim 12, wherein the measurement configuration information comprises one or more sets of measurement configuration information; and each set of measurement configuration information in the one or more sets of measurement configuration information comprises a measurement identifier (ID), a serving cell measurement object having a binding relation with the measurement ID, and a report configuration having a binding relation with the measurement ID, wherein the report configuration comprises a trigger event for the measurement relaxation criterion.

15. The method of claim 14, wherein the trigger event comprises an entry condition and an exit condition for implementing the measurement relaxation criterion, an entry parameter corresponding to the entry condition, and an exit parameter corresponding to the exit condition.

16. The method of claim 15, wherein the measurement relaxation criterion comprises at least one of a non-cell edge criterion, a low mobility criterion, or a stationary criterion.

17. The method of claim 12, further comprising:

obtaining a measurement result reported periodically by the terminal, and determining the measurement relaxation mechanism based on the measurement result.

18. The method of claim 11, wherein sending the measurement relaxation criterion information comprises:

sending a measurement relaxation criterion parameter required for the terminal to perform the measurement relaxation.

19. The method of claim 18, wherein sending the measurement relaxation criterion parameter required for the terminal to perform the measurement relaxation comprises:

sending the measurement relaxation criterion parameter required for the terminal to perform the measurement relaxation based on a system message or a radio resource control dedicated signaling.

20. A communication device based on a measurement relaxation mechanism, comprising:

a processor; and a memory for storing instructions executable by the processor; wherein the processor is configured to perform the communication method based on a measurement relaxation mechanism claim 11.

21. A communication device based on a measurement relaxation mechanism, comprising:

a processor; and a memory for storing instructions executable by the processor; wherein the processor is configured to:

receive measurement relaxation criterion information sent by a network device, wherein the measurement relaxation criterion information indicates a measurement relaxation criterion for performing measurement relaxation when a terminal is in a radio resource control (RRC) connected state; and perform, based on the measurement relaxation criterion information, measurement on a serving cell;

in response to a measurement result satisfying the measurement relaxation criterion, perform measurement relaxation and transmit to the network device via an RRC message, a measurement relaxation indication; and in response to the measurement result no longer satisfying the measurement relaxation criterion, stop the measurement relaxation and transmit to the network device via the RRC message, the measurement relaxation indication.

* * * * *